March 30, 1926.
P. B. KROUT
WIRE CLAMP
Filed Jan. 26, 1925
1,579,005
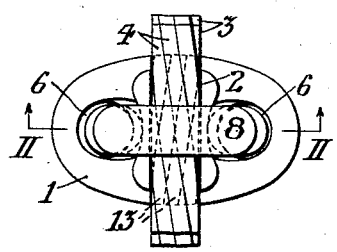
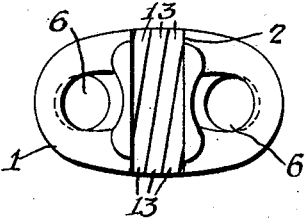
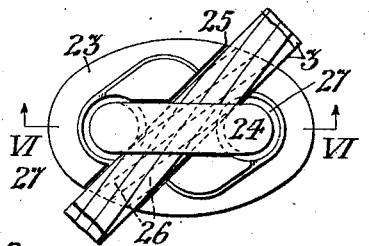
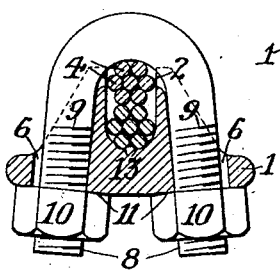
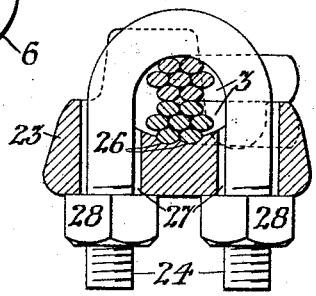
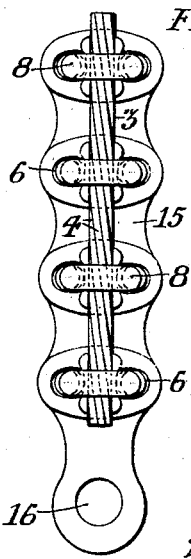
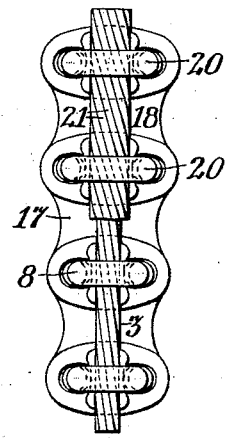
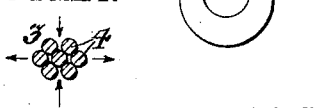
INVENTOR:
PALLED BERTRAM KROUT, Patented Mar. 30, 1926.

1,579,005

UNITED STATES PATENT OFFICE.

PALLED BERTRAM KROUT, OF NARBERTH, PENNSYLVANIA.

WIRE CLAMP.

Application filed January 26, 1925. Serial No. 4,967.

*To all whom it may concern:*

Be it known that I, PALLED BERTRAM KROUT, a citizen of the United States, residing at Narberth, in the county of Montgomery and State of Pennsylvania, have invented a certain new and useful Improvement in Wire Clamps, whereof the following is a specification, reference being had to the accompanying drawings.

My invention relates to devices adapted for clamping cables formed of a plurality of spirally laid wires, by means of a bolt having a bight extending transversely across the cable. Ordinarily, such clamps do not include any means for determining the rotary position of the cable with reference to the bolt. However, I have discovered that a certain rotary position of the cable with reference to the bolt and particularly with reference to the direction of pressure of the bolt upon the cable is of paramount importance in attaining the maximum holding effect of the clamp. Therefore, my improvement includes means designed and adapted to insure that the cable shall be guided to and held in that certain most efficient relation to the clamp.

My invention includes a multiple form of such a clamp wherein a series of bolts are adapted to be independently engaged with a single cable and, as the critical relation of the wires of the cable above contemplated occurs at such intervals throughout its length as are determined by the pitch of the spiral form in which the cable is laid; an essential feature of such multiple device is that the bolts are spaced axially with reference to the cable so as to respectively compress the latter at the regions of maximum efficiency of holding effect aforesaid. That is to say; in such multiple form of my invention; both the rotary position of the cable and the axially spaced relation of the respective clamping bolts are critical factors in attaining the maximum clamping effect.

As hereinafter described, the specific features of my invention above contemplated are exemplified with reference to a cable formed of seven wires in symmetrical relation. However, such a cable may be employed as the core of a nineteen wire cable; it being usual to form a nineteen wire cable by laying twelve additional wires spirally around such a seven wire cable. Heretofore, clamping devices for nineteen wire cables have merely engaged the wires forming the exterior congeries thereof, with the effect that when subjected to tensile strain, the congeries of seven wires forming the core thereof slips axially in telescopic relation with the surrounding congeries of twelve wires; such axial movement being accompanied by a relative rotary movement of said inner and outer portions of the cable. Therefore, I provide a form of my invention including a plurality of clamping bolts, some of which are arranged to directly engage the peripheral wires of a cable and some of which are adapted to engage an inner axial group of the wires of the same cable so as to secure the latter against such telescopic slipping movement.

My invention includes the various novel features of construction and arrangement hereinafter more definitely specified.

In said drawings; Fig. I is a plan view of a simple form of my invention, wherein the clamping bolt extends transversely, and at right angles, to the axis of the cable.

Fig. II is a sectional view taken on the line II, II in Fig. I.

Fig. III is a plan view of a multiple form of clamp of the type shown in Figs. I and II and provided with a terminal eye; the bolts therein being spaced axially with respect to the cable in accordance with the spiral pitch of the cable wires, as above contemplated.

Fig. IV is a multiple form of clamp, of the type shown in Figs. I and II, but adapted to clamp the outer and inner congeries of wires of the cable independently.

Fig. V is a plan view of a modified form of my invention, wherein the clamping bolt extends transversely, but obliquely, to the axis of the cable.

Fig. VI is a sectional view, taken on the line VI, VI in Fig. V.

Fig. VII is a plan view of a multiple form of clamp of the type shown in Figs. V and VI; the bolts therein being spaced axially with respect to the cable in accordance with the spiral pitch of the cable wires, as above contemplated.

Fig. VIII is an end view showing the normal right angular cross section of the cable indicated in the other figures.

Fig. IX is an end view of the form of cable shown in said figures, as deformed under pressure of a bolt which spreads it laterally when held in the critical position of rotation aforesaid.

Fig. X is a plan view of the clamp block shown in Fig. I.

Referring to the form of my invention shown in Figs. I and II; the block 1, which is conveniently formed as a drop forging of steel, has the main groove 2 in it, preferably of such width as to closely fit the maximum diameter of the cables 3 which are normally of hexagonal cross section because they are each formed of seven wires 4 of which six are grouped in a circular series around a single axial wire. Said groove 2 lies between the two bolt holes 6 which extend through said block 1, to receive the U-bolt 8. To facilitate the drop forging of such blocks 1, I prefer to form said holes slightly diverging downwardly, and correspondingly shape said bolt 8. Said bolt is provided with screw threads 9 at its opposite ends for engagement with the nuts 10, and seats 11, for said bolts 10, extending at right angles to the axes of said bolt ends, are formed on said block 1; so that said bolt 8 tends to constrict the cable 3 in its bight when drawn into clamping position, shown in Fig. II, by rotation of said nuts 10.

It may be observed that if no means were provided for guiding and holding said cables 3 in any predetermined rotary position with respect to said clamp block 1; they might be clamped with their greatest diameters in line with each other in the direction of the stress of said bolt 8, with the six wires on the common diameters of said cables extending in contact with each other from the bottom of said groove 2 to the under side of the bight in said bolt 8; with the nuts 10 set as tightly as possible. However, that relation is inherently unstable because upon subjecting the cables 3 to tensile stress, they may, and do, turn one-twelfth of a revolution, thus presenting their minimum diameters between the bottom of said grooves 2 and the under side of said bolt bight, and thus release themselves from the pressure of said bolt and, consequently, nullify the clamping effect of the latter and permit the cables to slip through the block 1.

Therefore, I provide means to insure that said cables shall be guided to and held in such position as to present their minimum diameters between the bottom of said groove 2 and the under side of the bight of said bolt 8. Such means preferably includes a series of flutes 13 which extend spirally in said block 1, in correspondence with the spiral pitch of the wires 4 in said cable 3. For instance, the cable 3 illustrated is of nominal three-eighth inch diameter and the spiral pitch of each wire is five inches. That is to say, each of the exterior wires 4 in each of the cables 3 makes a single convolution in each five inches of length of said cable. The critical factor is that said flutes shall be so placed that the cable 3 shall be held in the rotary position shown in Fig. II at the plane where the U-bolt 8 extends transversely across the same, as shown in Fig. II. In that position; when the bolt 8 is drawn toward the block 1 by rotation of the nuts 10, the wires 4 of the cables 3 are compressed between the bottom of the groove 2 and the under side of the bight of said bolt so as to wedge the upper and lower wires of each cable between its three wires which are alined in horizontal position as shown in Fig. II at the diameter of each cable; so as to not only compress each cable to its minimum dimensions in the direction of the strain on said bolt, but also to spread each cable laterally against the side walls of said groove 2, with the maximum clamping effect. It is obvious that such relation of the wires of the cables is a stable one, as distinguished from the unstable relation above contemplated. Consequently, my improved construction and arrangement aforesaid permit the rapid assembling of such clamps upon cables with a certain and maximum holding effect upon the latter, as distinguished from the ordinary construction and arrangement which, as above noted, permit the assembly of clamps upon cable in such relation as to nullify the clamping effect and release the cables when the latter are subjected to strain.

In Fig. III, I have shown a multiple form of clamp of the type indicated in Figs. I and II, including the block 15, having series of holes 6 for four U-bolts 8 which are so spaced with respect to the length of the cables 3 that each of said bolts comes at a region thereof where the wires are in the critical relation above described. For instance, with said cable having a spiral pitch of five inches, that critical position of the wires occurs at intervals of five-sixths of an inch and, therefore, the distance between the U-bolts must be a multiple of that length and, in Fig. III, I have shown said bolts twice that distance apart. That is to say, the bolts are spaced at intervals of one and two-thirds inches apart longitudinally with respect to the cable 3; so as to present the wires 4 of said cables in the plane of each bolt 8 in the position shown in Fig. II, where they are held in the flutes 13 which are provided in said block 15.

Although I have shown four bolts 8 in a single block 15 in Fig. III; it is to be understood that clamps may be manufactured in accordance with my invention, for any desired number of bolts. Moreover, as indicated in Fig. III, any of my improved clamps may be provided with a terminal eye 16 for connection of the cable with a support.

In Fig. IV I have shown a multiple form of clamp, including a block 17, of the type indicated in Figs. I to III inclusive, but adapted to clamp a nineteen wire cable 18 by separately engaging the inner and outer congeries of the wires thereof; the bolts 8 in Fig. IV being adapted to engage the inner congeries of wires forming the seven wire core 3 of said cable 18, in the manner indicated in Fig. III. The bolts 20 in Fig. IV, which are similar to the bolts 8, but larger, are adapted to engage the outer congeries of twelve wires 21 in said cable 18. It is to be understood that each of said bolts 8 and 20 in Fig. IV extends transversely with respect to the cable 18 at a region of the latter where the respective congeries of wires are in such position of rotation with respect to said clamp block 17 that the minimum diameter thereof is presented in the direction of compression effected by said bolts; and that said wires are guided to and held in such position of rotation, by suitable flutes in said block 17, such as indicated at 13 in Fig. II. It may be observed that said flutes 13 extend the full width of said block 1, as indicated in dotted lines in Fig. I, and in full lines in Fig. X.

However, it is not essential to the attainment of the critical arrangement aforesaid that the clamping bolt shall extend transversely to the cable at right angles to the latter. For instance, in Figs. V and VI, I have shown a wire clamp including a block 23, of the general construction and arrangement claimed in my copending application Serial No. 737,759, filed September 15, 1924 in that the clamping bolt 24 therein extends obliquely transverse to the axis of the groove 25 provided for the cables 3. As shown in Fig. VI; said block 23 has flutes 26, similar to the flutes 13 shown in Fig. II, and the cables 3 are thereby guided to and held in the critical position aforesaid with reference to the direction of the clamping effect of said bolt 24, which extends through holes 27 in said block 23 and is provided with nuts 28. It may be observed that said flutes 26 extend the full width of said block 23, as indicated by the dotted lines in Fig. V.

I have shown, in Fig. VII, a multiple form of clamp, including a block 30, of the type indicated in Figs. V and VI; the bolts 24 therein being spaced axially with respect to the cable 3 in accordance with the spiral pitch of the cable wires, as above contemplated. Of course, any desired number of clamping bolts may be employed in such a clamp block 30, and the latter may be provided with a terminal eye 31 for connection of said cable with a support.

In Fig. VIII, I have shown an end view or cross section of a cable with the wires in the normal symmertical relation and, in Fig. IX, I have shown such a cable as distorted by the clamping action aforesaid; such distortion including the spreading of the wires 4 of the cable horizontally from the position shown in Fig. VIII. It is obvious that in the normal relation of the wires shown in Fig. VIII, the configuration of the cable in any transverse plane is substantially that of a hexagonal polygon, of which the maximum diameter is from crest to crest of the hexagon and the minimum diameter that between such crests.

Moreover, unless it is desired to detachably connect such clamps with cables, I prefer to make the clamp blocks aforesaid of ductile metal, for instance, a bronze alloy, so that when the nuts are rotated on the U-bolts to draw the latter into the extreme clamping position, the blocks are deformed to permanently grip the cables. For instance, the blocks may bend at the bottom of the U-shaped groove in which the cables extend and the upper edges of the side walls of said grooves may bend over to C-shape, or even O-shape, wrapping around the adjacent cable, and being indented by the latter, to thus engage the cables with greater clamping effect than if such blocks are made of metal which is not thus deformable by the clamping action.

Therefore, I do not desire to limit myself to the precise details of construction and arrangement herein set forth, as it is obvious that various modifications may be made therein without departing from the essential features of my invention, as defined in the appended claims.

I claim:

1. In a wire cable clamp; the combination with a metal block having a groove extending longitudinally therein, of different widths in different regions thereof; such widths respectively corresponding with the exterior diameter of a cable and with the diameter of a core congeries of wires in said cable; said groove having flutes in the bottom thereof corresponding in spiral curvature with the pitch and lay of the wires in the cable; said block having pairs of bolt holes extending therethrough at intervals in the length of said groove bearing an aliquot relation to the spiral pitch of said wires and flutes, and in planes where two flutes are in symmertical relation with said groove at the bottom thereof; of U-bolts fitted to said holes, having bights extending transversely, obliquely, across said groove, at respective regions of minimum diameter of the cable positioned therein by said flutes, and having their free ends screw threaded; and nuts respectively engaged with the ends of said bolts and bearing against said block; said bolts having their ends diverged from their bights, whereby said nuts extend in planes transverse to each other, and said block having faces at right angles to the axes of said bolt ends, for seats for said nuts; whereby a cable may be clamped by bolted engagement with both its exterior periphery and the periphery of its core wires.

2. In a wire cable clamp; the combination with a metal block having a groove extending longitudinally therein, of different widths in different regions thereof; such widths respectively corresponding with the exterior diameter of a cable and with the diameter of a core congeries of wires in said cable; said groove having flutes in the bottom thereof corresponding in spiral curvature with the pitch and lay of the wires in the cable; said block having pairs of bolt holes extending therethrough at intervals in the length of said groove bearing an aliquot relation to the spiral pitch of said wires and flutes, and in planes where two flutes are in symmetrical relation with said groove at the bottom thereof; of U-bolts fitted to said holes, having bights extending transversely across said groove, at respective regions of minimum diameter of the cable positioned therein by said flutes, and having their free ends screw threaded; and nuts respectively engaged with the ends of said bolts and bearing against said block; and said block having faces at right angles to the axes of said bolt ends, for seats for said nuts; whereby a cable may be clamped by bolted engagement with both its exterior periphery and the periphery of its core wires.

3. In a wire cable clamp; the combination with a metal block having a groove extending longitudinally therein, corresponding with the exterior diameter of a cable; said groove having flutes in the bottom thereof corresponding in spiral curvature with the pitch and lay of the wires in the cable; said block having pairs of bolt holes extending therethrough at intervals in the length of said groove bearing an aliquot relation to the spiral pitch of said wires and flutes, and in planes where two flutes are in symmetrical relation with said groove at the bottom thereof; of U-bolts fitted to said holes, having bights extending transversely across said groove, at respective regions of minimum diameter of the cable positioned therein by said flutes, and having their free ends screw threaded; and nuts respectively engaged with the ends of said bolts and bearing against said block; said bolts having their ends diverged from their bights, whereby said nuts extend in planes transverse to each other, and said block having faces at right angles to the axes of said bolt ends, for seats for said nuts; whereby a cable may be clamped by bolted engagement with both its exterior periphery and the periphery of its core wires.

4. In a wire cable clamp; the combination with a metal block having a groove extending longitudinally therein, corresponding with the exterior diameter of a cable; said groove having flutes in the bottom thereof corresponding in spiral curvature with the pitch and lay of the wires in the cable; said block having pairs of bolt holes extending therethrough at intervals in the length of said groove bearing an aliquot relation to the spiral pitch of said wires and flutes, and in planes where two flutes are in symmetrical relation with said groove at the bottom thereof; of U-bolts fitted to said holes, having bights extending transversely across said groove, at respective regions of minimum diameter of the cable positioned therein by said flutes, and having their free ends screw threaded; and nuts respectively engaged with the ends of said bolts and bearing against said block; and said block having faces at right angles to the axes of said bolt ends, for seats for said nuts; whereby a cable may be clamped by bolted engagement with both its exterior periphery and the periphery of its core wires.

5. In a wire cable clamp; the combination with a metal block having a groove extending longitudinally therein, corresponding with the exterior diameter of a cable; said groove having flutes in the bottom thereof corresponding in spiral curvature with the pitch and lay of the wires in the cable; said block having a pair of bolt holes extending therethrough in a plane where two flutes are in symmetrical relation with said groove at the bottom thereof; of a U-bolt fitted to said holes, having its bight extending transversely, obliquely, across said groove, at a region of minimum diameter of the cable positioned therein by said flutes, and having its free ends screw threaded; and nuts respectively engaged with the ends of said bolt and bearing against said block; said bolt having its ends diverged from its bight, whereby said nuts extend in planes transverse to each other, and said block having faces at right angles to the axes of said bolt ends, for seats for said nuts; whereby a cable may be clamped by compression between said block and bolt at a region of minimum diameter of such cable.

6. In a wire cable clamp; the combination with a metal block having a groove extending longitudinally therein, corresponding with the exterior diameter of a cable; said groove having flutes in the bottom thereof corresponding in spiral curvature with the pitch and lay of the wires in the cable; said block having a pair of bolt holes extending therethrough in a plane where two flutes are in symmetrical relation with said groove at the bottom thereof; of a U-bolt fitted to said holes, having its bight extending transversely across said groove, at a region of minimum diameter of the cable positioned therein by said flutes, and having its free ends screw threaded; and nuts respectively engaged with the ends of said bolt and bearing against said block; said bolt having its ends diverged from its bight, whereby said nuts extend in planes transverse to each other, and said block having faces at right angles to the axes of said bolt ends, for seats for said nuts; whereby a cable may be clamped by compression between said block and bolt at a region of minimum diameter.

7. In a wire cable clamp; the combination with a metal block having a groove extending longitudinally therein, corresponding with the exterior diameter of a cable; said groove having flutes therein corresponding in spiral curvature with the pitch and lay of the wires in the cable; said block having a pair of bolt holes extending therethrough in a plane where two flutes are in symmetrical relation with said groove at the bottom thereof; of a U-bolt fitted to said holes, having its bight extending transversely across said groove; said flutes arranged to guide such cable to a predetermined rotary position with reference to the direction of stress on said bolt; and nuts arranged to respectively engage the ends of said bolt and bear against said block; whereby a cable, of substantially polygonal configuration in cross section, may be clamped by compression between said block and bolt at a region of minimum diameter of such cable.

8. In a wire cable clamp; the combination with a metal block having a groove extending longitudinally therein, corresponding with the exterior diameter of a cable; said groove having flutes therein corresponding in spiral curvature with the pitch and lay of the wires in the cable; said block having a pair of bolt holes extending therethrough in a plane where two flutes are in symmetrical relation with said groove at the bottom thereof; of a U-bolt fitted to said holes having its bight extending transversely across said groove; said flutes arranged to guide such cable to a predetermined rotary position with reference to the direction of stress of said bolt; and nuts respectively engaged with the ends of said bolt and bearing against said block; whereby a cable, of substantially polygonal configuration in cross section may be clamped by compression between said block and bolt at a region of minimum diameter of such cable.

9. In a clamp for a spiral wire cable, substantially polygonal in cross section and of different diameters at different regions of its length; the combination with a metal block having a groove fitted to receive such cable, and having flutes therein corresponding in spiral curvature with the pitch and lay of the wires in the cable and arranged to guide the cable wires to a predetermined position of rotation; said block having a pair of bolt holes extending therethrough in a plane where two flutes are in symmetrical relation with said groove at the bottom thereof; of a U-bolt fitted to said holes, having a bight extending transversely across said groove at a region of minimum diameter of the cable positioned therein by said flutes and having its free ends screw threaded; and nuts respectively engaged with the ends of said bolt and bearing against said block.

10. In a clamp for a spiral wire cable, substantially polygonal in cross section and of different diameters at different regions; the combination with a metal block having a groove fitted to receive such cable, and having flutes therein corresponding in spiral curvature with the pitch and lay of the wires in the cable and arranged to guide the cable wires to a predetermined position of rotation; said block having a pair of bolt holes extending therethrough; of a U-bolt fitted to said holes, having a bight extending transversely across said groove at a region of minimum diameter of the cable positioned therein by said flutes and having its free ends screw threaded; and nuts respectively engaged with the ends of said bolt and bearing against said block.

11. In a clamp for a spiral wire cable, substantially polygonal in cross section and of different diameters at different regions; the combination with a metal block having a groove fitted to receive such cable, and having flutes therein corresponding in spiral curvature with the pitch and lay of the wires in the cable and arranged to guide the cable wires to a predetermined position of rotation; said block having a pair of bolt holes extending therethrough; of a bolt fitted to said holes, having a bight extending transversely across said groove at a region of minimum diameter of the cable positioned therein by said flutes and having its ends screw threaded; and nuts respectively engaged with the ends of said bolt.

12. In a clamp for a spiral wire cable, substantially polygonal in cross section and of different diameters at different regions; the combination with a metal block having a groove fitted to receive such cable, and having a flute corresponding in spiral curvature with the pitch and lay of the wires in the cable and arranged to guide the cable wires to a predetermined position of rotation; of a U-bolt extending transversely across said groove at a region of minimum diameter of the cable positioned therein by said flute; and a nut engaged with said bolt.

13. In a clamp for a spiral wire cable, substantially polygonal in cross section and of different diameters at different regions; the combination with a metal block having means arranged to guide the cable wires to a predetermined position of rotation; of a U-bolt extending transversely across said metal block at a region of minimum diameter of the cable positioned therein; and nuts engaged with said bolt.

14. In a clamp for a spiral wire cable, substantially polygonal in cross section and of different diameters at different regions; the combination with a metal block having a groove fitted to receive two such cables, in parallel relation, and having means arranged to guide cable wires to a predetermined position of rotation; of a U-bolt extending transversely across said groove at a region of minimum diameter of the cables positioned therein; and nuts engaged with said bolt.

15. Means for clamping a spiral wire cable of substantially polygonal cross section; including a block having means arranged to guide and hold such cable in a predetermined rotary position, and a U-bolt, in cooperative relation with such guiding means; whereby clamping action of said U-bolt shall spread the wires of said cable laterally.

16. Means for clamping spiral wire cable, substantially polygonal in cross section and of different diameters at different regions; including a clamp block and means arranged to clamp said cable in said block at regions of minimum diameter of said cable, with reference to the direction of pressure of a U-bolt upon said cable.

17. In a wire cable clamp; the combination with a metal block having a groove therein; of a U-bolt extending across said groove; and nuts for said bolt; said groove having flutes therein corresponding in spiral curvature with the pitch and lay of the wires in a seven wire cable; said flutes so placed that such cable shall be guided to the position in which a diametrical plane of the cable intersecting three wires therein extends transversely with respect to the sides of said groove and the ends of said bolt, at the axial plane of said bolt, with two upper and two lower wires of the cable arranged to be wedged between said three wires by the clamping action of said bolt; whereby two wires of said three wires of the cable are spread apart laterally against the side walls of said groove when said nuts are screwed on said bolt.

18. In a wire clamp; the combination with a block of ductile metal having a wire groove therein; of a U-bolt extending transversely to said groove; nuts on said bolt arranged to bear against said block in planes transverse to each other; whereby said nuts may be turned on said bolt to deform said block into engagement with wires in said groove.

19. In a wire clamp; the combination with a block of ductile metal having a wire groove therein; of a U-bolt extending transversely to said groove; said bolt having its ends diverging from its bight; nuts on said bolt arranged to bear against said block; whereby said nuts may be turned on said bolt to deform said block into engagement with wires in said groove.

20. In a wire clamp; the combination with a block of ductile metal having a wire groove therein; said block having a pair of bolt holes extending slightly diverging downward therethrough; of a U-bolt fitted to said holes, having its bight extending transversely across said groove; said bolt having its ends diverging from its bight to fit the sides of said bolt holes; and nuts on said bolt, arranged to bear against said block in planes transverse to each other; whereby said nuts may be turned on said bolt to deform said block into engagement with wire in said groove.

21. In a clamp for stranded wire cables having different diametrical dimensions; the combination with a metal block having a cable seat; said cable seat having means therein arranged to guide the cable wires to a predetermined position of rotation of the cable and present the smallest diametrical dimension of said cable with respect to the clamping action of a U-bolt; of a U-bolt extending across said cable seat and adjustable through said metal block at a minimum diameter of such a cable; and nuts arranged to engage the threads of said bolt; whereby a cable may be compressed in the plane of its smallest diametrical dimension, by tightening said nuts on said bolt.

In testimony whereof, I have hereunto signed my name at Philadelphia, Pennsylvania, this nineteenth day of January, 1925.

PALLED BERTRAM KROUT.